United States Patent
Kim

(10) Patent No.: US 9,410,589 B2
(45) Date of Patent: Aug. 9, 2016

(54) WATERPROOF DEVICE FOR DRUM BRAKE

(71) Applicant: Hyundai Motor Company, Seoul (KR)

(72) Inventor: Jung Hoon Kim, Iksan-si (KR)

(73) Assignee: Hyundai Motor Company, Seoul (KR)

( * ) Notice: Subject to any disclaimer, the term of this patent is extended or adjusted under 35 U.S.C. 154(b) by 165 days.

(21) Appl. No.: 14/275,677

(22) Filed: May 12, 2014

(65) Prior Publication Data

US 2015/0136545 A1    May 21, 2015

(30) Foreign Application Priority Data

Nov. 19, 2013    (KR) ........................ 10-2013-0140825

(51) Int. Cl.
| | |
|---|---|
| *F16D 65/00* | (2006.01) |
| *F16D 65/10* | (2006.01) |
| *F16D 51/00* | (2006.01) |
| *F16D 55/00* | (2006.01) |

(52) U.S. Cl.
CPC ........ *F16D 65/0025* (2013.01); *F16D 65/0006* (2013.01); *F16D 65/0031* (2013.01); *F16D 65/10* (2013.01); *F16D 2051/005* (2013.01); *F16D 2055/0037* (2013.01)

(58) Field of Classification Search
CPC .......... F16D 65/0031; F16D 2051/005; F16D 65/0025
See application file for complete search history.

(56) References Cited

U.S. PATENT DOCUMENTS

| | | | | |
|---|---|---|---|---|
| 1,903,935 | A * | 4/1933 | Nichols | F16D 65/10 188/218 A |
| 1,930,708 | A * | 10/1933 | Cunningham | F16D 65/10 188/218 A |
| 2,921,654 | A * | 1/1960 | Bradfield | F16D 65/10 188/218 A |
| 3,598,417 | A * | 8/1971 | Mueller | F16D 65/10 188/218 A |
| 4,227,704 | A * | 10/1980 | Blaha | F16D 65/10 188/18 R |
| 4,243,234 | A * | 1/1981 | Blaha | F16D 65/10 188/18 R |
| 4,313,528 | A | 2/1982 | Ito | |
| RE31,314 | E * | 7/1983 | Blaha | F16D 65/10 188/18 R |
| 8,167,098 | B2 | 5/2012 | Jessberger | |
| 2002/0106954 | A1* | 8/2002 | Sakumoto | D04H 13/002 442/104 |

FOREIGN PATENT DOCUMENTS

| | | |
|---|---|---|
| JP | 56-128250 A | 10/1981 |
| JP | 2001-304314 A | 10/2001 |
| JP | 2008-64199 A | 3/2008 |
| KR | 2003-0066623 A | 8/2003 |
| KR | 10-0691841 B1 | 3/2007 |

\* cited by examiner

*Primary Examiner* — Nicholas J Lane
(74) *Attorney, Agent, or Firm* — Morgan, Lewis & Bockius LLP

(57) ABSTRACT

A waterproof device for a drum brake can prevent noise and malfunction of a brake by stopping water from flowing into the drum brake. The waterproof device for a drum brake can minimize not only foreign substances, but also water flowing into a drum, by improving the mounting structure of a dust cover that is mounted at the drum inlet of a drum brake in a new structure that is mounted hermetically and watertightly along the inner edge of a drum by buoyancy or pressure due to water when passing a puddle or a wheel washer.

16 Claims, 5 Drawing Sheets

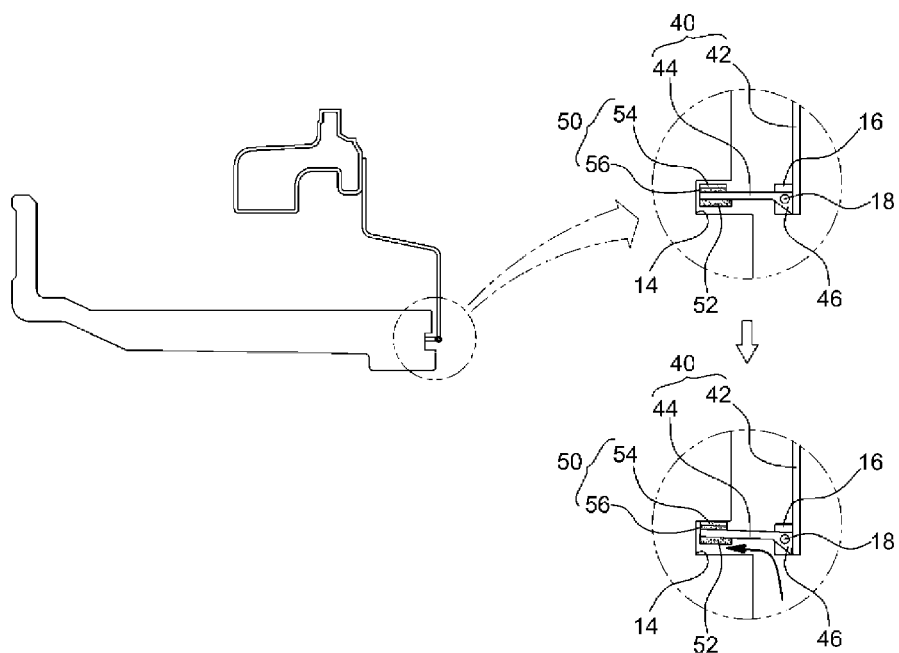
FIG.6
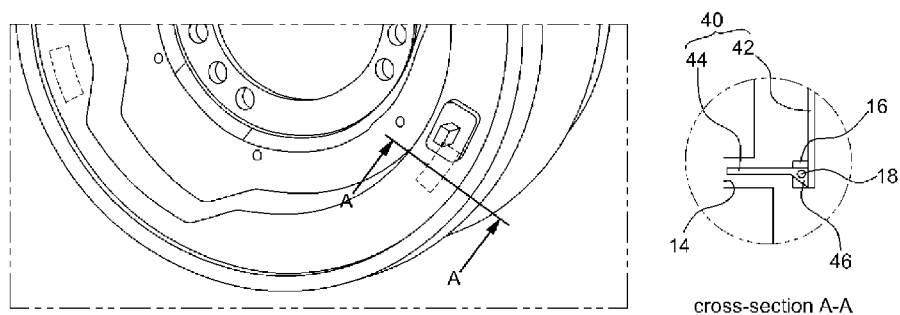
FIG.7
cross-section A-A
FIG. 8

WATERPROOF DEVICE FOR DRUM BRAKE

CROSS-REFERENCE TO RELATED APPLICATION

The present application claims priority of Korean Patent Application Number 10-2013-0140825 filed Nov. 19, 2013, the entire contents of which application is incorporated herein for all purposes by this reference.

BACKGROUND OF INVENTION

1. Field of Invention

The present invention relates to a waterproof device for a drum brake, and more particularly to a waterproof device for a drum brake which can prevent noise and malfunction of a brake by stopping water from flowing into the drum brake.

2. Description of Related Art

Large-sized commercial vehicles used in for construction sites or unpaved roads are supposed to have their wheels washed (wheels and tires washed) before starting, in order to observe the rules for road contamination prevention, because the wheels or tires are covered with dirt, etc.

Wheels are usually washed in the way of removing contaminants on the wheels or tires while they pass a puddle or a wheel washer ejecting water, but contaminants may flow into the drums of the drum brakes in the wheel-washing and cause noise of the brakes and malfunction due to corrosion.

Accordingly, air drum brakes of commercial vehicles are equipped with a specific drum cover on predetermined sides to prevent foreign substances from being flowed into the inner sides of the drum and the internal parts including the linings and provide cooling performance by discharging heat; nevertheless, water and foreign substances flow into the drums and exert a bad influence on the barking performance in wheel-washing or raining.

The structure of a dust cover of the related art and the problem of the structure are described hereafter.

FIGS. 1 and 2 are views showing the structure of a dust cover of the related art mounted around the inner edge of a drum for drum brakes.

The dust cover 30 performs cooling by absorbing heat from the drum and discharging it to the outside while preventing foreign substances from flowing into the drum.

As shown in FIGS. 1 and 2, the dust cover 30 of the related art is fastened to an anchor bracket 12 supporting the shoe of the drum brake by bolts, such that it covers the inlet of the drum 10 and closes up the inside of the drum.

In particular, the inner end portion of the dust cover 30 is fastened to the anchor bracket 12 by bolts and the outer end portion is in close contact with the inner circumferential surface of the drum 10 such that foreign substances can be blocked and heat can be discharged.

The outer end portion of the dust cover 30 is simply inserted a groove 14 formed along the outer circumferential surface of the drum in close contact with the groove 14 to block foreign substances, so there is a problem in that external air can flow into the drum 10 and water flowing inside is not completely blocked.

Accordingly, there is a problem that water flows into the drum and contaminants (particles of sand, dirt, and cement etc.) flowing with the water into the drum through the gap between the outer end of the dust cover 30 and the groove 14 of the drum 10 in wheel-washing and raining.

Further, the contaminants flowing into the drum together with water cause excessive noise in operation of the drum brake or cause scoring (stripes) on the surface of the drum and the lining by sticking on the inner side of the drum, and in some cases, they cause a problem in the braking performance and make it difficult to mount/separate the drum brake in maintenance by sticking on the operation part of the drum brake.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide a waterproof device for a drum brake which can minimize not only foreign substances, but also water flowing into a drum, by improving the mounting structure of a dust cover that is mounted at the drum inlet of a drum brake in a new structure that is mounted hermetically and watertightly along the inner circumferential surface of a drum by buoyancy or pressure due to water when passing a puddle or a wheel washer.

Various aspects of the present invention provide for a waterproof device of a drum brake, which includes: a first dust cover fixed to an anchor bracket for the shoe of a drum brake; and a second dust cover of which the outer end portion is hinged to the outer end portion of the first dust cover and the inner end portion is pivotably inserted into a groove formed at the inlet of a drum, in which the inner end of the second dust cover pivots by buoyancy or external force comes hermetically and watertightly in contact with the side of the groove of the drum.

A pair of high pin-fixing blocks may be integrally formed on the inner side of the outer end portion of the first dust cover and the outer end portion of the second dust cover may be pivotably connected to the hinge pin-fixing blocks by a hinge shaft.

A locking wedge, which keeps the second dust cover horizontal by locking to the outer end portion of the first dust cover, may be further integrally formed on the bottom of the outer end portion of the second dust cover.

A sealing member that can come in close contact with the side of the groove of the drum may be mounted on the top of the inner end portion of the second dust cover.

The sealing member may be made of foaming resin having low specific gravity in the shape of a rectangular or semicircular block.

A sealing member formed by stacking a float having low specific gravity and generating buoyancy and a rubber seal capable of coming in close contact with the side of the groove of the drum may be attached to the top of the inner end portion of the second dust cover.

The rubber seat may be formed in the shape of a rectangular or semicircular block and the float may be made of foaming resin having low specific gravity.

The sealing member may be made of resin having high thermal resistance considering heat generated from a drum.

A sub-float having low specific gravity may be further attached to the bottom of the inner end portion of the second dust cover.

First, it is possible to stop water in addition to foreign substances from flowing into a drum brake by providing an improved structure in which a dust cover mounted at the inlet of a drum of a drum brake comes hermetically and watertightly in close contact with the inner circumferential side of the drum while being moved by buoyancy or pressure due to water.

Second, since foreign substances and water are stopped from flowing into a drum brake, it is possible to corrosion of a drum brake and abnormal noise in braking, and to improve durability of a drum brake.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is a cross-sectional view showing an exemplary waterproof device of a drum brake according to the present invention; and FIG. 7 is a schematic view showing the mounting position of a hinge pin-fixing block for a second dust cover of an exemplary waterproof device of a drum brake according to the present invention.

FIG. 8 is an enlarged schematic view showing the mounting position of a hinge pin-fixing block for a second dust cover of an exemplary waterproof device of a drum brake according to the present invention, taken along line A-A of FIG. 7.

Figure 1:
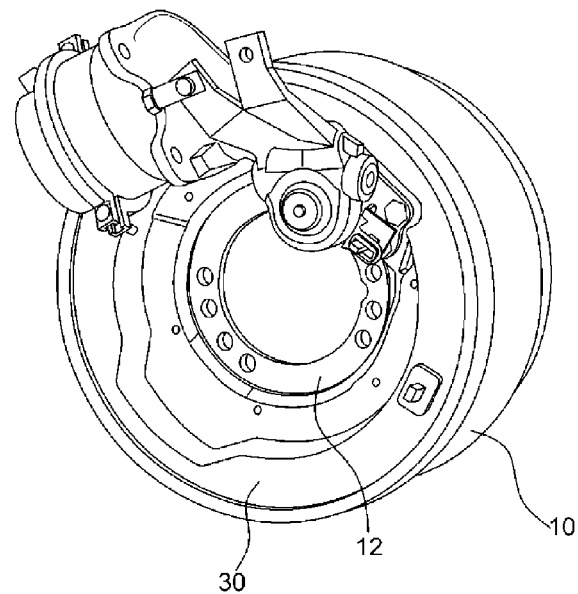
FIG. 1 is a view showing a mounting structure of a dust cover of the related art.
Figure 2:
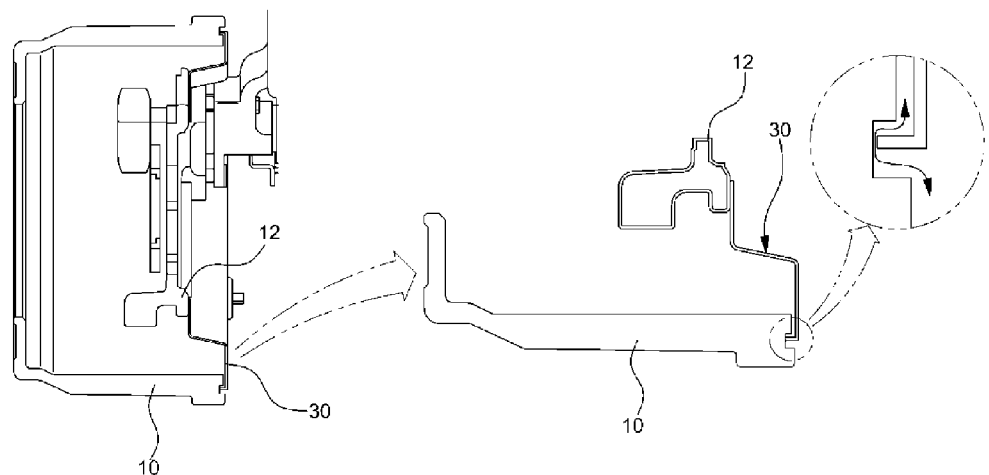
FIG. 2 is a view showing a mounting structure of a dust cover of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various aspects of the present invention have been made to provide a waterproof device of a drum brake which can prevent water in addition to foreign substances from flowing into a drum brake.

Figure 3:
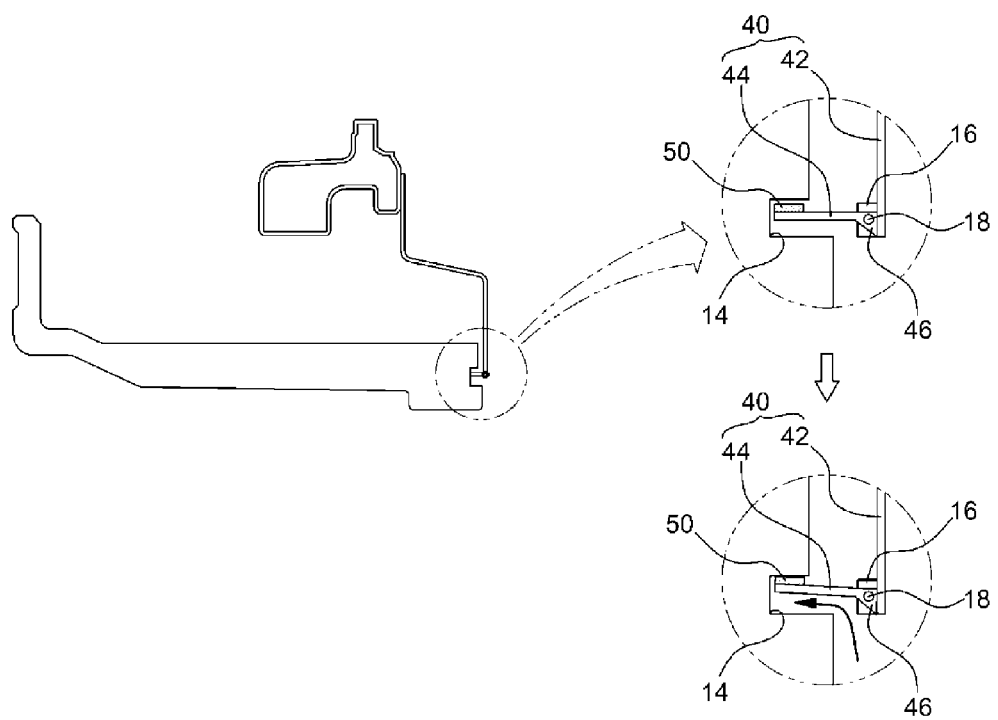
FIG. 3 is a cross-sectional view showing an exemplary waterproof device of a drum brake according to the present invention.

FIG. 3 is a cross-sectional view showing a waterproof device of a drum brake according to various embodiments of the present invention.

A dust cover 40 of the present invention is composed of a first dust cover 42 that is fixed to an anchor bracket 12 supporting the shoe of a drum brake by bolts and a second dust cover 44 pivotably hinged to the outer end portion of the first dust cover 42.

The first dust cover 42 is vertically arranged and the second dust cover 44 is horizontally arranged, such that the first dust cover 42 and the second dust cover 44 are arranged almost at a right angle to each other.

The first dust cover 42 and the second dust cover 44 perform cooling of absorbing heat from a drum and discharging it to the outside, and particularly, the second dust cover 44 stops foreign substances and water from flowing into the drum, when water pressure or external force is applied.

To this end, the outer end portion of the second dust cover 44 is hinged to the lower outer end portion of the first dust cover 42 and the inner end is pivotably inserted into a groove 14 formed at the inlet of the drum 10, for example, along a annular surface of the drum.

A pair of hinge pin-fixing blocks for hinging the second dust cover 44 is formed, as shown in FIG. 7, at a predetermined distance integrally on the inner side of the lower inner end portion of the first dust cover 42. One will appreciate that such integral components may be monolithically formed.

Accordingly, both ends of the outer end portion of the second dust cover 44 is pivotably connected to the hinge pin-fixing blocks 16 by hinge shafts 18.

In particular, a locking wedge 46 that keeps the second dust cover 44 horizontal by locking to the outer end portion of the first dust cover 42 is integrally formed on the bottom of the outer end portion of the second cover 44, such that the first dust cover 42 is not turned downward from the horizontal position. One will appreciate that such integral components may be monolithically formed.

That is, the locking wedge 46 of the second dust cover 44 keeps the second dust cover 44 horizontal, in close contact with the inner side of the outer end portion of the first dust cover 42 vertically arranged, such that the second dust cover 44 does not pivot down about the hinge shaft 18.

As the second dust cover 44 keeps horizontal, a predetermined gap is defined formed between the inner end of the second dust cover and the wall of the groove 14 of the drum 10, such that external air can flow into the drum.

Therefore, dust collecting in the drum is scattered by external air (cooling air) flowing inside and can be easily discharged out of the drum.

In contrast, in the wheel-washing, raining, or passing a puddle, water and foreign substances in the water flow into the drum and cause corrosion of the drum brake, which may exert bad influence on the braking performance.

In order to prevent this problem, a sealing member 50 according to various embodiments of the present invention which can be brought in close contact with the upper side of the groove 14 of the drum 10 is mounted on the top of the inner end portion of the second dust cover 44.

The sealing member 50 according to the various embodiments may be the common rubber seal, but it is preferable to use one made of foaming resin, which has low specific gravity and generates buoyancy, in the shape of a rectangular or a semicircular block.

Therefore, in wheel-washing or raining, and passing a puddle, when buoyancy by water or external force such as water pressure is applied to the inner end portion of the second dust cover 44 and the sealing member 50 on the inner end portion, the inner end of the second cover 44 pivots upward and comes hermetically and watertightly in close contact with the upper side of the groove 14 of the drum 10, such that it is possible to easily stop water or foreign substances from flowing into the drum.

Figure 4:
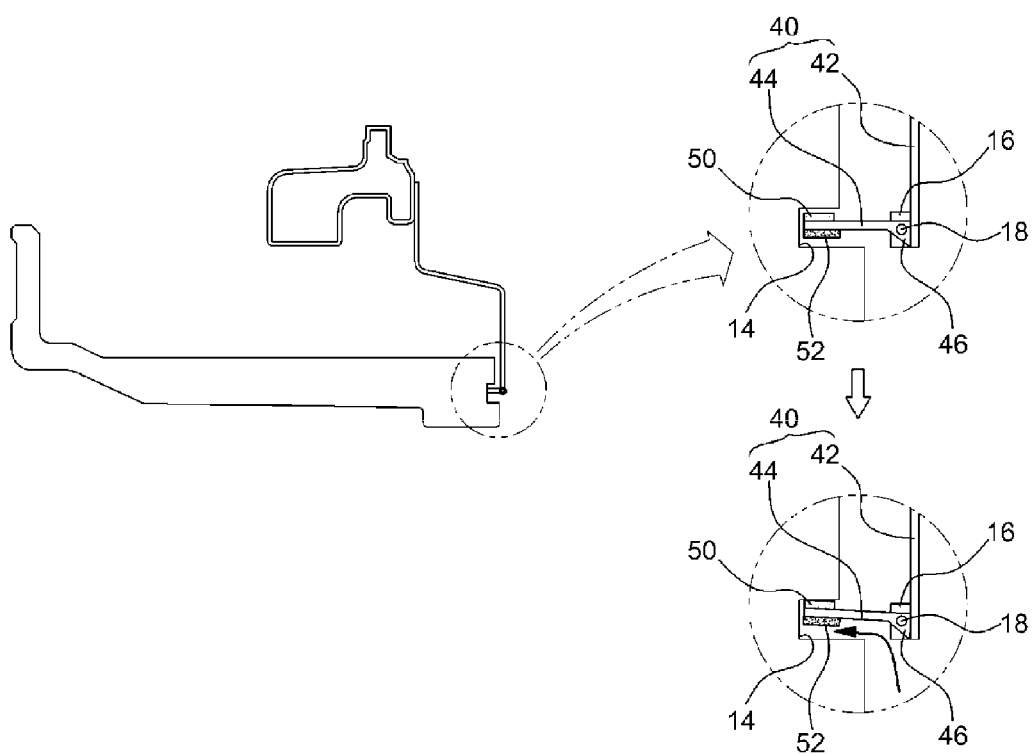
FIG. 4 is a cross-sectional view showing an exemplary waterproof device of a drum brake according to the present invention.

FIG. 4 is a cross-sectional view showing a waterproof device of a drum brake according to various embodiments of the present invention.

The waterproof device of FIG. 4 has a similar configuration as that shown in FIG. 3 and is characterized in that a sub-float 56 having low specific gravity is further attached to the bottom of the inner end portion of the second dust cover 44.

In detail, with the sealing member 50 shown in FIG. 3 on the inner end portion of the second dust cover 44, the sub-float 56 having low specific gravity (e.g. foaming resin) is further attached to the bottom of the inner end portion.

Therefore, in wheel-washing or raining and passing a puddle, the inner end of the second dust cover 44 more easily pivots to the upper side of the groove 14 of the drum 10 by buoyancy of the sub-float 56 and the sealing member 50 is brought hermetically and watertightly in closer contact with the upper side of the groove 14, such that it is possible to easily stop water or foreign substances from flowing into the drum.

Figure 5:
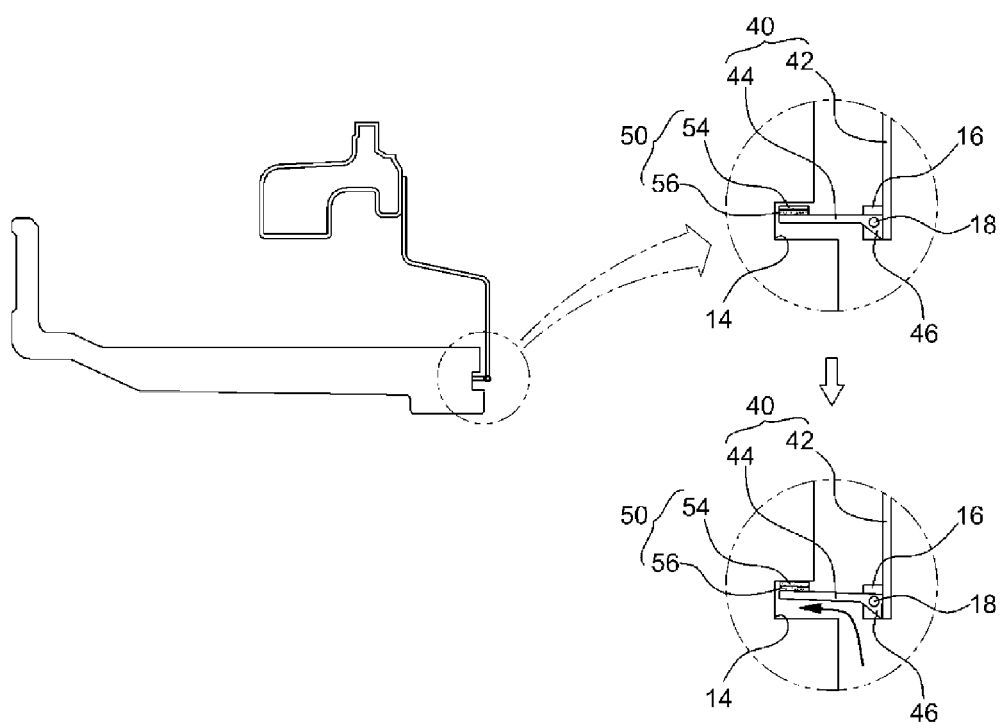
FIG. 5 is a cross-sectional view showing an exemplary waterproof device of a drum brake according to the present invention.

FIG. 5 is a cross-sectional view showing a waterproof device of a drum brake according to various embodiments of the present invention.

The waterproof device of FIG. 5 has a similar configuration as that of FIG. 3, except the sealing member 50 attached to the inner end portion of the second dust 44.

The sealing member 50 of FIG. 5 is composed two stacked materials of a float 52 having low specific gravity, attached to the top of the inner end portion of the second dust cover, and generating buoyancy and a rubber seat 54 stacked on the float 52 in close contact with the upper side of the groove 14 of the drum 10.

The rubber seal 54 is formed in the shape of a rectangular or semicircular block to increase the force for close contact with the upper side of the groove 14 and the float 52 is made of foam resin having low specific gravity in the shape of a rectangular block that supports the rubber seat 54.

Therefore, in wheel-washing or raining and passing a puddle, the inner end of the second dust cover 44 pivots to the upper side of the drum 10 by buoyancy of the float 52 and the rubber seal 54 on the float 52 is brought hermetically and watertightly in close contact with the upper side of the groove 14, such that it is possible to easily stop water or foreign substances from flowing into the drum.

FIG. 6 is a cross-sectional view showing a waterproof device of a drum brake according to various embodiments of the present invention.

The waterproof device of FIG. 6 has the same configuration as that of FIG. 5 and is characterized in that a float having low specific gravity is further attached to the bottom of the inner end portion of the second dust cover 44.

In detail, with the float 52 and the rubber seat 54 of sealing member 50 of FIG. 5 on the inner end portion of the second dust cover 44, the sub-float 56 having low specific gravity (e.g., foaming resin) is further attached to the bottom of the inner end portion.

Therefore, in wheel-washing or raining and passing a puddle, the inner end of the second dust cover 44 more easily pivots to the upper side of the groove 14 of the drum 10 by buoyancy of the sub-float 56 and the rubber seat 54 is brought hermetically and watertightly in closer contact with the upper side of the groove 14, such that it is possible to easily stop water or foreign substances from flowing into the drum.

Further, the sealing members in various embodiments may be made of resin having high thermal resistance to prevent deformation due to heat generated from the drum.

For convenience in explanation and accurate definition in the appended claims, the terms upper and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A waterproof device of a dram brake, comprising:
   a first dust cover fixed to an anchor bracket for a shoe of the drum brake, the first dust cover including a first outer end portion; and
   a second dust cover including a second outer end portion hinged to the first outer end portion of the first dust cover, and an inner end portion pivotably inserted into a groove formed along an annular surface of a drum of the drum brake;
   wherein the inner end of the second dust cover abuts against a side of the groove of the drum to form a seal between the first dust cover and the drum;
   wherein a pair of hinge pin-fixing blocks is integrally formed on an inner side of the first outer end portion of the first dust cover and the second outer end portion of the second dust cover is pivotably connected to the hinge pin-fixing blocks by a hinge shaft.

2. The device of claim 1, wherein a locking wedge, which keeps the second dust cover horizontal by locking to the first outer end portion of the first dust cover, is further integrally formed on the bottom of the second outer end portion of the second dust cover.

3. The device of claim 1, wherein a sealing member that can come in close contact with the side of the groove of the drum is mounted on the top of the inner end portion of the second dust cover.

4. The device of claim 3, wherein the sealing member is made of foaming resin in the shape of a rectangular or semicircular block.

5. The device of claim 1, wherein a sealing member formed by stacking a float generating buoyancy and a rubber seal capable of coming in contact with the side of the groove of the drum is attached to the top of the inner end portion of the second dust cover.

6. The device of claim 5, wherein the rubber seat is formed in the shape of a rectangular or semicircular block and the float is made of foaming resin.

7. The device of claim 3, wherein the sealing member is made of resin having a thermal resistance considering heat generated from a drum.

8. The device of claim 3, wherein a sub-float is further attached to the bottom of the inner end portion of the second dust cover.

9. A waterproof device of a drum brake, comprising:
a first dust cover fixed to an anchor bracket for a shoe of the drum brake, the first dust cover including a first outer end portion; and
a second dust cover including a second outer end portion hinged to the first outer end portion of the first dust cover, and an inner end portion pivotably inserted into a groove formed along an annular surface of a drum of the drum brake;
wherein the inner end of the second dust cover abuts against a side of the groove of the drum to form a seal between the first dust cover and the drum, and
wherein a sealing member formed by stacking a float generating buoyancy and a rubber seal capable of coming in contact with the side of the groove of the drum is attached to the top of the inner end portion of the second dust cover.

10. The device of claim 9, wherein a pair of hinge pin-fixing blocks is integrally formed on an inner side of the first outer end portion of the first dust cover and the second outer end portion of the second dust cover is pivotably connected to the hinge pin-fixing blocks by a hinge shaft.

11. The device of claim 9, wherein a locking wedge, which keeps the second dust cover horizontal by locking to the first outer end portion of the first dust cover, is further integrally formed on the bottom of the second outer end portion of the second dust cover.

12. The device of claim 9, wherein a sealing member that can come in close contact with the side of the groove of the drum is mounted on the top of the inner end portion of the second dust cover.

13. The device of claim 12, wherein the sealing member is made of foaming resin in the shape of a rectangular or semi-circular block.

14. The device of claim 9, wherein the rubber seat is formed in the shape of a rectangular or semicircular block and the float is made of foaming resin.

15. The device of claim 12, wherein the sealing member is made of resin having a thermal resistance considering heat generated from a drum.

16. The device of claim 12, wherein a sub-float is further attached to the bottom of the inner end portion of the second dust cover.

* * * * *